May 24, 1949.  F. D. REED, JR  2,471,121
BRIDLE
Filed April 26, 1946
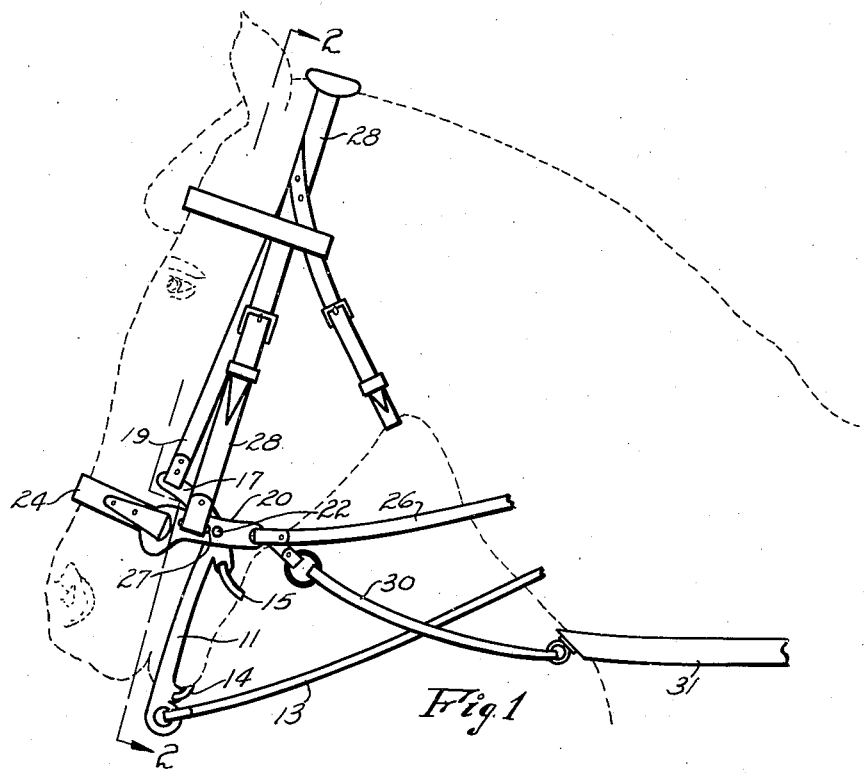
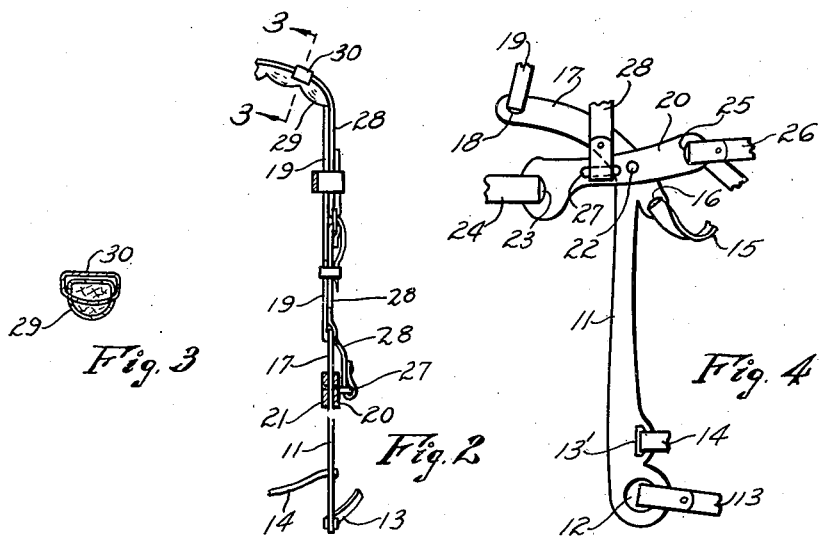
Fig. 1
Fig. 3
Fig. 2
Fig. 4
INVENTOR
FRANK D. REED JR.
BY Robert A. Sloman
ATTORNEY Patented May 24, 1949

2,471,121

UNITED STATES PATENT OFFICE 2,471,121

BRIDLE

Frank D. Reed, Jr., Detroit, Mich., assignor to Barbara Reed, Detroit, Mich.

Application April 26, 1946, Serial No. 665,223

2 Claims. (Cl. 54—6)

This invention relates to bridles for horses, and more particularly to the type known as the Hackmore bridle, wherein no mouthbit is employed.

It is the object of the present invention to provide a bridle which incorporates means by which the rider may exert controlling pressure upon the sensitive parts of the horse's head, i. e., back of the ears, on the front of the nose, and under the chin.

It is the object of this invention to provide means forming part of the bridle whereby manual pressure upon the reins is transmitted to points back of the horse's ears, over the front of the nose, and under the chin.

It is the further object of this invention to provide a pivotal means mounted upon and forming a part of the bridle for effectively transmitting manual pressure from the reins to the sensitive points of the horse's head above set out.

These and other objects will be seen from the following specification and claims in conjunction with the appended drawing in which:

Fig. 1 is a side elevational view of the half of the bridle mounted upon one side of the horse's head.

Fig. 2 is a front elevational section thereof on line 2—2 of Fig. 1.

Fig. 3 is a section on line 3—3 of Fig. 2; and

Fig. 4 is an enlarged side elevational view of the pivotal portion of the bridle and its mounting.

It will be understood that the above drawing illustrates merely one preferable embodiment of the invention, and that other embodiments are contemplated within the scope of the claims hereafter set out.

Referring to the drawing the bridle consists of a pair of spaced levers 11 adapted for mounting upon opposite sides of the horse's head, one only of which is shown in Fig. 1.

The lower end of each lever has openings 12 therein through which are attached the ends of driving reins 13, on opposite sides of the horse's head. Openings 13' in the lower ends of levers 11 are joined by the spacer strap 14 for maintaining a parallel spaced relation between the lower ends of the levers.

The ends of curb strap 15 securingly extend through openings 16 in levers 11, and are adapted to engage the horse's head under the chin. Each lever 11 has the forwardly formed extension 17 at each of their upper ends with slots 18 therein through which the opposite ends of bottom head-stall 19 extend.

Transverse arms 20 and 21 are secured upon opposite sides of the levers 11 and are pivotally joined thereto by rivets 22. The front forward ends of arms 20 and 21 have openings 23 formed therein through which extend and are secured the ends of nose-band 24.

The rear portions of arms 21 and 20 also have openings 25 through which secondary reins 26 extend and are secured. Rings 27 are secured upon the outside of arms 20 on opposite sides of the horse's head; and the ends of top head-stall 28 extend through said rings and are secured thereto.

Referring to Figures 1 and 2 the bottom head-stall 19 extends upwardly and over the horse's head with the corrugated portions 29 being centrally secured thereto and forming an integral part thereof. Members 29 provide a plurality of point contacts upon the back of the horse's head just behind the ears, whereby pressure transmitted to head-stall 19 is effectively imparted to that sensitive part of the horse's head.

Top head-stall 28 also extends upwardly and is positioned over bottom head-stall 19, and retained in position thereon by looped straps 30 carried by head-stall 19.

Though not illustrated in the drawing, it is understood that levers 11 are positioned upon opposite sides of the horse's head to support the free ends of nose strap 24, spacer strap 14, chin strap 15 as well as the ends of head-stalls 19 and 28. Similarly the free ends of reins 13 are joined to the lower ends of levers 11 on opposite sides of the horse's head; and similarly secondary reins 26.

While the two straps or arms 20 and 21 provide the pivotal mounting 22 for lever 11 it will be understood that one such arm could also be suitably employed if desired.

In operation it will be seen that levers 11 are adapted to pivot counterclockwise when reins 13 are under tension. Such motion transmits a multiplied force to lower head-stall 19 in view of the respective distances of the ends of the levers to their pivotal points 22.

Thus the downward movement of lever portion 17 is effective to transmit a relatively strong pressure to head-stall 19 and particularly to the corrugated portions 29 on the underside thereof which engage sensitive portions of the horse's head behind his ears. Similarly it will be seen that pressure is also transmitted to nose band 24 through its supporting arms 20 and 21 upon which levers 11 are pivotally mounted.

Thus it is seen that the bridle hereinabove described, by its novel construction is adapted to effectively impart tension on reins 13 to the horse's head back of the ears, to the front of the nose and to the back of the chin.

Referring to the drawing, it will be understood that secondary reins 26 may terminate in the openings 25 at the ends of arms 20 on the other hand reins 26 may extend through openings 25 to join martingale straps 30'—31, whereby pressure on reins 26 will control the positioning of the horse's head.

It will be further understood that secondary reins 26 may be omitted if desired. And further, it will be understood that martingales 30'—31 could be satisfactorily employed with their free ends joined to openings 25 in arms 20, or on the other hand, martingales 30'—31 could be joined to a common strap which loosely connects arms 20 on opposite sides of the horse's head.

It will be understood that reins 26 and 13 can be used together for controlling the horse; or on the other hand, either of said reins can be effective when separately employed.

Having described my invention, reference should now be had to the claims which follow for determining the scope thereof.

I claim:

1. A bitless bridle comprising in combination a nose band, rearwardly extending arms joined to the ends of said nose band adapted for positioning on opposite sides of a horse's head, a pair of rotatable levers pivotally mounted on said arms, a headstall positioned back of the horse's ears with its free ends secured to the upper ends of said levers, said latter ends extending forwardly maintaining said headstall taut so that any forward pivotal movement of said ends will immediately apply control pressure back of the horse's ears, and manually operated reins joined to the lower ends of said levers to effect pivotal controlling movements thereof.

2. The combination, a nose band, spaced side arms joined to the ends of said nose band, a pair of spaced levers pivotally mounted on said arms, a headstall with its free ends secured to the upper ends of said levers, said latter ends extending forwardly of the pivotal connection of said levers maintaining said headstall taut so that any forward pivotal movement of said ends will immediately apply control pressure back of the horse's ears, manually operable reins joined to the lower ends of said levers for effecting pivotal controlling movement thereof, stationary attaching rings centrally secured on said arms, and a second headstall mounted over the first headstall with its free ends joined to said rings.

FRANK D. REED, Jr.

REFERENCES CITED

The following references are of record in the file of this patent:

UNITED STATES PATENTS

| Number | Name | Date |
|---|---|---|
| 621,625 | Van Buskirk | Mar. 21, 1899 |
| 826,810 | Udhaug | July 24, 1906 |
| 2,041,620 | Stephens | May 19, 1936 |
| 2,186,350 | Simon | Jan. 9, 1940 |
| 2,342,449 | Burgess | Feb. 22, 1944 |
| 2,347,752 | Schmelz | May 2, 1944 |
| 2,349,375 | Ray | May 23, 1944 |

FOREIGN PATENTS

| Number | Country | Date |
|---|---|---|
| 10,698 | Great Britain | Mar. 11, 1899 |
| 247,565 | Germany | June 3, 1912 |
| 506,460 | Great Britain | May 30, 1939 |